United States Patent [19]

Wakai et al.

[11] 3,730,978

[45] May 1, 1973

[54] COLOR KILLER CIRCUIT

[75] Inventors: Shuzo Wakai, Kyoto; Hitoshi Sugano, Takatsuki, both of Japan

[73] Assignee: Matsushita Electronics Corporation, Osaka, Japan

[22] Filed: Mar. 22, 1972

[21] Appl. No.: 236,917

[30] Foreign Application Priority Data

Mar. 30, 1971 Japan ................................46/19359

[52] U.S. Cl. ............................................178/5.4 CK

[51] Int. Cl. ...............................................H04n 9/48

[58] Field of Search ......................178/5.4 CK, 5.4 R, 178/5.4 AC, 5.4 SD, 5.4 SY, 5.4 HE

[56] References Cited

UNITED STATES PATENTS 3,604,842 9/1971 Harwood ........................178/5.4 AC

*Primary Examiner*—Robert L. Griffin
*Assistant Examiner*—George G. Stellar
*Attorney*—S. Delvalle Goldsmith et al.

[57] ABSTRACT

A color killer circuit in which means are provided so as to carry out a stable color killing operation free from fluctuations in power supply voltage so that the color killing operation may not be directly affected by the absolute value of the color killer control voltage.

1 Claim, 2 Drawing Figures

COLOR KILLER CIRCUIT

This invention relates to a color killer circuit used in color television receivers.

A color television receiver is required to operate in response to both the color television broadcast signals and the black-and-white television broadcast signals, and to this end, means are provided in the receiver for the selective actuation of the color circuit depending on the presence or absence of a color burst signal in the television signal. This selective actuation is carried out by a color killer circuit incorporated in the receiver. In this color killer circuit, means must be provided for converting a very weak color burst signal detected by the antenna into a DC voltage so as to carry out a stable color killing operation.

Figure 1:
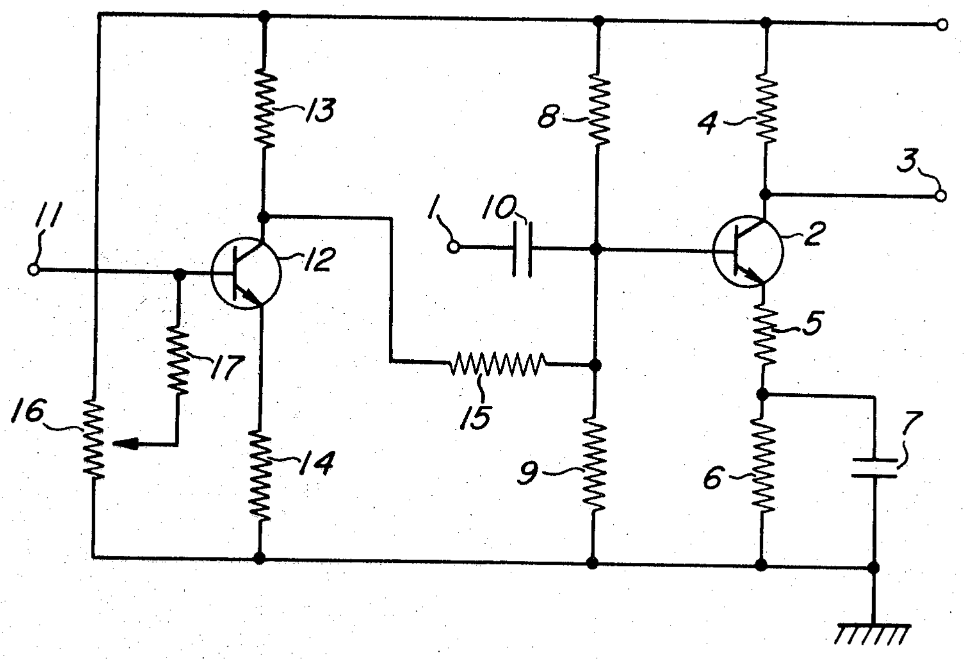
FIG. 1 PRIOR ART
FIG. 1 is a circuit diagram of a prior art color killer circuit.

FIG. 1 shows the structure of a paior art color killer circuit. Referring to FIG. 1, a color signal is applied to a transistor 2 through a color signal input terminal 1 and a coupling capacitor 10, and after being amplified by the transistor 2, the color signal appears at an output terminal 3. A collector resistor 4 and emitter resistors 5 and 6 are provided for the transistor 2, and a by-pass capacitor 7 is connected in parallel with the resistor 6. Resistors 8 and 9 are provided for applying a predetermined base bias to the transistor 2. A color killer control voltage is applied to a terminal 11 from a control circuit (not shown), and a transistor 12 conducts or is cut off depending on the level of the color killer control voltage. A collector resistor 13 and an emitter resistor 14 are provided for the transistor 12, and a resistor 15 is provided to suitably bias the transistor 2 so that the transistor 2 is cut off or conducts in response to the conduction or cut-off of the transistor 12. Resistors 16 and 17 are provided as an adjustor to absorb any fluctuations in the circuit component values or in the operating characteristics of the transistor 12. The color killer control circuit (not shown) connected to the color killer circuit is capable of applying a control voltage of low level to the terminal 11 when the receiver is receiving a color television broadcast signal and a control voltage of high level to the terminal 11 when the receiver is receiving a black-and-white television broadcast signal.

When the receiver is receiving a color television broadcast signal, a control voltage of low level is applied to the terminal 11 as described above. Therefore, the transistor 12 is cut off and its collector voltage is high. This voltage is applied through the resistor 15 to the base of the transistor 2 so as to bias the transistor 2 in such a manner that it operates normally as an amplifier. Thus, the color signal applied to the input terminal 1 is amplified by the transistor 2 to appear at the output terminal 3.

On the other hand, when the receiver is receiving a black-and-white television broadcast signal, a control voltage of high level is applied to the terminal 11. Therefore, the transistor 12 conducts and its collector voltage is low. Due to the reduction in the voltage applied to the base of the transistor 2 through the resistor 15, the transistor 2 is cut off to cease the amplifying operation on the color signal applied to the input terminal 1, and no output appears at the output terminal 3. Thus, the color signal cannot be transmitted to all the circuits connected to the output terminal 3. This is equivalent to the interruption of the operation of the color circuit in the receiver.

The prior art color killer circuit carries out the color killing operation in the manner above described. However, the color killing operation of the prior art color killer circuit is adversely affected by fluctuations in the power supply voltage. Further, the prior art color killer circuit is arranged so that the color killing operation is carried out on the basis of the absolute value of the color killer voltage applied to the terminal 11. Thus, the prior art color killer circuit has involved such a problem that the absolute value of the color killer control voltage must be completely stabilized in order that the circuit can carry out a stable color killing operation.

With a view to eliminating such a problem involved in the prior art color killer circuit, it is a primary object of the present invention to provide a novel and useful color killer circuit in which means are provided so as to carry out a stable color killing operation free from any fluctuations in the power supply voltage and so that the color killing operation may not be directly affected by the absolute value of the color killer control voltage.

Figure 2:
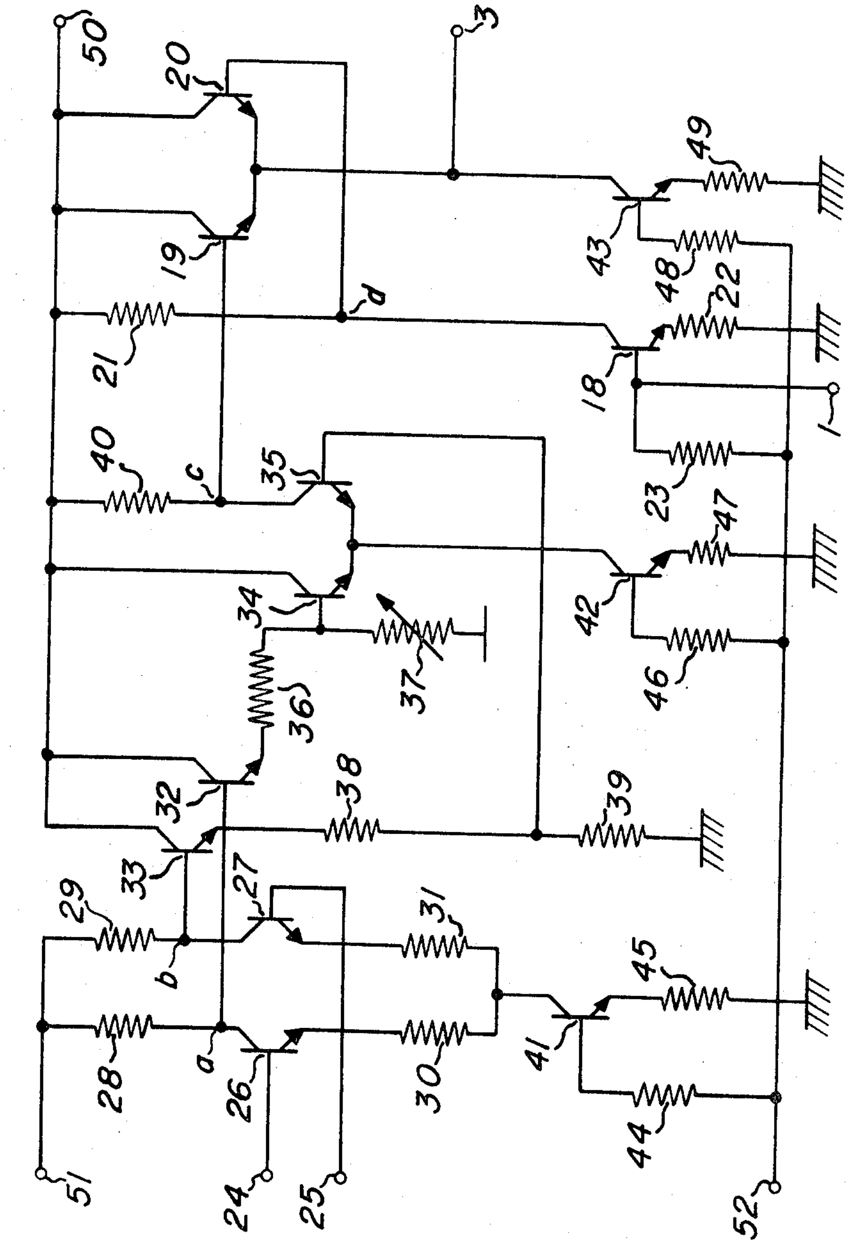
FIG. 2 is a circuit diagram of an embodiment of a color killer circuit according to the present invention.

Referring now to FIG. 2 showing a color killer circuit embodying the present invention, a color signal is applied to a transistor 18 through an input terminal 1, and after being amplified by the transistor 18, the color signal appears at an output terminal 3. A pair of transistors 19 and 20 constitutes a differential amplifier which functions to determine the selective appearance of the color signal at the output terminal 3. A collector resistor 21, an emitter resistor 22 and a base resistor 23 are provided for the transistor 18. Color killer control voltages of different levels are applied in differential form through terminals 24 and 25 to a pair of transistors 26 and 27 which constitute another differential amplifier. A collector resistor 28 and an emitter resistor 30 are provided for the transistor 26, and a collector resistor 29 and an emitter resistor 31 are provided for the transistor 27. Emitter follower transistors 32 and 33 are connected to the collector of the transistors 26 and 27 at points *a* and *b* respectively. A pair of transistors 34 and 35 constitute another differential amplifier which governs the color killing operation. Resistors 36, 37, 38 and 39 are provided so as to suitably set the operating point of the color killer circuit. A plurality of transistors 41, 42 and 43 are provided to form a constant-current source for the respective differential amplifiers. Base and emitter resistors 44, 45, 46, 47, 48 and 49 are provided for the transistors 41, 42 and 43. Power supply and bias voltages are applied by way of terminals 50, 51 and 52.

In operation, a color killer control circuit (not shown) applies a voltage of high level to the terminal 24 and a voltage of low level to the terminal 25 when the receiver is receiving a color television broadcast signal, while it applies a voltage of high level to the terminal 25 and a voltage of low level to the terminal 24 when the receiver is receiving a black-and-white television broadcast signal.

When the receiver is receiving a color television broadcast signal, the voltage applied to the terminal 24 is higher than the voltage applied to the terminal 25 as above described and the relation $V_a < V_b$ holds between the voltage $V_a$ at the point *a* and the voltage $V_b$ at the point *b*. As a result, the transistor 34 to which the base bias is applied through the emitter follower transistor 32 is cut off, while the transistor 35 to which the base bias is applied through the emitter follower transistor 33 conducts, and the potential at a point *c*, hence the base bias voltage for the transistor 19 is reduced. Therefore, the transistor 19 is cut off and the color signal applied to the input terminal 1 appears at the output terminal 3.

On the other hand, when the receiver is receiving a black-and-white television broadcast signal, the voltage applied to the terminal 24 is now lower than the voltage applied to the terminal 25 and the relation $V_a > V_b$ holds between the voltage $V_a$ at the point *a* and the voltage $V_b$ at the point *b*. As a result, the transistor 34 conducts and the transistor 35 is cut off. Therefore, the potential at the point *c* is increased to cause conduction of the transistor 19. Consequently, the emitter potential of the transistors 19 and 20 is slightly lower than the potential at the point *c* and the base potential of the transistor 20 is lower than this emitter potential. Thus, the transistor 20 is cut off and loses the function of transmitting the color signal applied to the input terminal 1 to the output terminal 3. The circuit condition thereby established is equivalent to the interruption of the operation of the color circuit.

The color killer circuit according to the present invention carries out a color killing operation in a manner as above described. In this color killer circuit, it is merely required to apply a constant voltage to the terminal 52. By virtue of the provision of the transistors 41, 42, 43 and 18 in the color killer circuit, the relative values of the voltages at the points *a* and *b* and at the points *c* and *d* are substantially free from fluctuations in the voltage applied to the power supply terminal 50 and the bias supply terminal 51 and are solely dependent upon the relative values of the color killer control voltages applied to the terminals 24 and 25. Thus, the color killing operation is not affected by any variations in the absolute values of the voltages applied to the terminals 24 and 25.

It will be understood from the foregoing description that the color killer circuit according to the present invention is quite stable against any fluctuations in the power supply voltage and bias voltage and its circuit design is remarkably facilitated due to the elimination of the conditions which have heretofore been required for the complete stabilization of the absolute value of the color killer control voltage. Further, the circuit elements can be conveniently integrated in the form of an integrated circuit because the circuit consists solely of resistors and transistors.

What is claimed is:

1. A color killer circuit in a color television receiver comprising a first differential amplifier consisting of a pair of transistors arranged to be applied in differential form with two DC voltages whose relative magnitudes can be reversed depending on the reception of a color television broadcast signal or a black-and-white television broadcast signal, said first differential amplifier having a constant-current circuit portion in the emitter circuit thereof, a pair of emitter follower transistors arranged to be applied with the two outputs respectively of said first differential amplifier, a pair of voltage dividing means for dividing the voltage appearing at the emitter of each of said emitter follower transistors, a second differential amplifier consisting of a pair of transistors arranged to be applied in differential form with the voltages divided by said voltage dividing means, said second differential amplifier having a constant-current circuit portion in the emitter circuit thereof, and a third differential amplifier consisting of a pair of transistors arranged to be applied in differential form with one of the outputs of said second differential amplifier and a color signal applied to a color signal input terminal, said third differential amplifier having a color signal output terminal and a constant-current circuit portion in the emitter circuit thereof, one of the transistors in said third differential amplifier arranged to the applied with the color signal being cut off when the receiver is receiving a black-and-white television broadcast signal, thereby interrupting the transmission of the color signal to said color signal output terminal.

* * * * *